United States Patent
Tossici et al.

[11] Patent Number: 6,087,043
[45] Date of Patent: Jul. 11, 2000

[54] LITHIUM-ION RECHARGEABLE BATTERY WITH CARBON-BASED ANODE

[75] Inventors: Roberto Tossici, Camerino; Mario Berrettoni, Muccia; Roberto Marassi, Camerino, all of Italy; Vera Malimova, Mosca, Russian Federation; Bruno Scrosati, Rome, Italy

[73] Assignee: Consiglio Nazionale Delle Ricerche, Rome, Italy

[21] Appl. No.: 08/973,674

[22] PCT Filed: Jun. 14, 1996

[86] PCT No.: PCT/IT96/00121

§ 371 Date: Dec. 11, 1997

§ 102(e) Date: Dec. 11, 1997

[87] PCT Pub. No.: WO97/00539

PCT Pub. Date: Jan. 3, 1997

[30] Foreign Application Priority Data

Jun. 16, 1995 [IT] Italy .................. RM95A0411

[51] Int. Cl.[7] .................. H01M 4/58; H01M 10/40
[52] U.S. Cl. .................. 429/231.4
[58] Field of Search .................. 423/448, 460; 429/231.4

[56] References Cited

FOREIGN PATENT DOCUMENTS

0227056A2 7/1987 European Pat. Off. .
0227056A3 7/1987 European Pat. Off. .

OTHER PUBLICATIONS

Goutfer–Wurmser et al., "Superdense potassium concentration in some graphite intercalation compounds", Carbon, vol. 33, No. 11 pp. 1657–1659, Nov. 1995.
Tossici et al., "A high–rate carbon electrode . . . ", J. Electrochemical Soc. vol. 143, No. 3, p. L64, Mar. 1996.
Tossici et al., "Electrochemistry of KC8 in Lithium Containing Electrolytes . . . " J. Electrochem. Soc., vol. 144, No. 1, p. 186, Jan. 1997.
Elansari et al., "Synthesis, Characterisation and Structural Analysis of GICS . . . " Carbon, vol. 35, No. 4, p. 455, Apr. 1997.

Primary Examiner—Stephen Kalafut
Assistant Examiner—Carol Chaney
Attorney, Agent, or Firm—Smith, Gambrell & Russell

[57] ABSTRACT

A lithium-ion rechargeable battery with carbon-based anode comprising a cathode based on a lithium intercalating compound, such as a lithium-free or a lithiated compound, a non-aqueous lithium ion-conducting electrolyte and a carbon-based anode, wherein said carbon-based anode comprises, as the starting active material before the first cycle of the battery, the potassium intercalated graphite of the formula $KC_8$ (first stage potassium graphite intercalation compound), optionally together with a binder. After the first discharge cycle of the battery, most potassium ions are released from the intercalation compound, but the structure of the anode compound maintains an "expanded" interlayer distance, which greatly enhances the kinetics of the electrochemical process, thus resulting in a high-rate carbon anode. The positive counterelectrode material may be chosen both among lithiated and among lithium-free intercalation compounds.

20 Claims, 5 Drawing Sheets

■ $KC_8$ ELECTRODE

◆ GRAPHITE ELECTRODE

LITHIUM-ION RECHARGEABLE BATTERY WITH CARBON-BASED ANODE

SPECIFICATION

The present invention concerns a lithium-ion rechargeable battery with carbon-based anode. More specifically, the invention relates to the use of a known graphite intercalation compound as a starting material for a new type of high-rate carbon anode for versatile lithium-ion batteries.

The rapid increase of the portable electronic market, which includes popular electronic devices such as telephones, videotape recorders and computers, as well as the critical need to eliminate heavy metals such as lead, cadmium and mercury from the environment, are major driving forces for the development of advanced batteries. The effective development of said advanced batteries requires the use of high-capacity electrode materials in cell designs where the high energy content is associated with reliability and low cost.

In recent years, non-aqueous electrolyte secondary batteries using lithium as a negative electrode active material have attracted attention in view of the high levels of energy density that they can offer, thereby resulting in powerful devices of a relatively small size and weight. This, obviously, makes lithium secondary batteries very promising for use as power sources both in the field of electronic equipment and in that of electrical vehicles. In practice, however, the safety problems brought about by the presence of lithium metal have limited both the practical energy densities obtained and the maximum battery size in commercial products. In addition, it has been found that the charge/discharge efficiency of this kind of battery is low and its cycle life is short.

More recently, lithium batteries based on lithium-ion or "rocking chair" electrochemistries have been developed. Said batteries use two different lithium insertion compounds for the active cathode and anode material, and a non-aqueous, lithium ion-conducting electrolyte. The lithium insertion compounds are compounds capable of acting as a host solid for the reversible insertion, or intercalation, of lithium guest ions. During a discharge of the battery, lithium is removed from the host anode insertion compound and is inserted into the host cathode insertion compound, and on recharge the reverse occurs. Thus, the charge-discharge process of this kind of batteries involves the cyclic transfer of lithium ions (similar to rocking) from the anode to the cathode and vice-versa. Typically a carbonaceous material (partially graphitized carbon or graphite) is employed as the anode, and a lithiated transition metal oxide (e.g., $LiCoO_2$, $LiNiO_2$, $LiMn_2O_4$, generically $LiM_yO_z$) is employed as the cathode material, while the lithium ion-conducting electrolyte is, e.g., a solution of a lithium salt in one or more organic solvents.

Presently, lithium-ion batteries having energy densities two to three times greater than those of conventional rechargeable systems, such as nickel-metal hydride, nickel-cadmium and lead acid batteries, and with a life exceeding 1000 cycles, are being mass-produced by the Japanese industry and are in rapid development in the United States and in Europe. Due to this impressive achievement and considering the relevance that lithium-ion batteries have acquired in the consumer electronics market, major efforts are in progress to further optimize the existing battery design and performance and, alternatively, to identify and characterize new rocking-chair cell materials and configurations.

In view of that, carbon-based intercalation compounds have received considerable attention as potential anode materials for lithium-ion cells, and a number of different carbonaceous materials have been proposed for this use, including graphites, cokes, carbon-black, pyrolytic carbon, mesocarbons, carbon fiber, glassy carbon, etc. The goal is, generally, to increase the amount of lithium that can be reversibly stored in the material, while minimizing irreversible capacity losses, such as those associated with the formation of the so-called solid electrolyte interface (SEI).

Any form of carbon reversibly reacts with lithium, but the amount of lithium ion that can be reversibly stored in the host structure depends on different factors. It is known that the crystal structure of the carbonaceous material affects its ability to reversibly insert lithium (see, e.g., J. R. Dahn et al., "Lithium Batteries, New Materials and New Perspectives" edited by G. Pistoia, Elsevier North-Holland, p. 1–47, (1993)). At ambient temperature pure crystalline graphite, for instance, offers large theoretical reversible lithium capacity, as it can incorporate up to one lithium per six carbon atoms ($LiC_6$, stage one compound), which corresponds electrochemically to a maximum attainable capacity of 372 mAh/kg. Higher stage compounds (ranging from $LiC_{12}$ to $LiC_{32}$) precede the formation of $LiC_6$ over different potential regions.

More recently, carbonaceous materials with very high reversible capacity have been prepared by pyrolysis of suitable starting materials. K. Sato et al. (K. Sato, M. Noguchi, A. Demachi, N. Oki, M. Endo, Science, 264, 556 (1994)), and EP-A0 601 832 (Honda) disclose a carbon material suitable for use as an anode in a secondary lithium-ion battery. Said carbon material is obtained by heat treatment of an organic polymer having an aromatic structure containing at least one structure selected from the group consisting of o-bonding, m-bonding, a branching structure and a crosslinking structure (in particular, poly(p-phenylene), treated at 700° C.), and shows reversible capacities much greater than that of pure graphite (specifically, for the mentioned material, 680 mAh/g). A mechanism other than staging intercalation has been postulated to explain such high capacity, namely an adsorption mechanism of covalent $Li_2$ molecules, in place of the intercalation of $Li^+$ between carbon ring layers.

Also Dahn et al. (T. Zheng, Q. Zhong, J. R. Dahn, J. Electrochem. Soc., 142, L211 (1995); J. S. Xue and J. R. Dahn, J. Electrochem. Soc., 142, 3668, (1995)) have prepared a variety of carbon-based materials by low temperature treatment of resins. Single graphene sheets arranged like a "house of cards" predominate in the material obtained from resin thermal treatment. The micro- and nanoporosity can be controlled by oxidation, leading to materials capable to reversibility intercalate lithium in excess of 600 mAh/g with a mechanism involving adsorption of lithium on the internal surface of the nanopores. The size of the latter can be controlled in such a way to prevent solvent penetration and hence irreversible capacity losses.

Other alternatives for increasing the specific capacity of carbon aceous anode materials have included the addition of other elements to the carbon compound. For example, EP-A0 486 950 (Sony) mentions the addition of small amounts of phosphorus or boron to enhance the anode specific capacity. The mechanism behind this effect is unclear but it may be a result of modifications to the microstructure of the carbonaceous compound. Also, WO 94/23462 (The Regents of the University of California) discloses that a substantial increase in the energy storage capability of an anode made of a carbon foam can be obtained by doping the material with phosphorus, boron, arsenic or antimony.

With the same object of increasing the capacity of a carbon anode material by the use of additional elements, EP-A0 627 776 (Sharp) proposes a lithium secondary battery comprising, as the negative electrode, a material containing, as a main constituent, graphite particles which allow intercalation and deintercalation of lithium ions, together with copper oxide particles and a binder. The resulting anode material (graphite+CuO) appears to have a specific discharge capacity above 350 mAh/g.

In the same trend, EP-A-0 629 012 (Moli Energy) discloses a battery using carbonaceous materials with a graphite or disordered graphite structure prepared by chemical vapor deposition, wherein boron atoms or other electron acceptors, such as Al, Mg, Ga and Ca, are substituted for carbon atoms in the structure. The substitution appears to cause an increase in the reversible capacity of the material used as the electroactive material of a lithium-ion battery. The same author (in A. M. Wilson and J. R. Dahn, J. Electrochem. Soc., 142, 326, (1995)) discloses carbon-based materials prepared by chemical vapor deposition doped with metal capable to alloy lithium. The alloying atoms are incorporated into the carbonaceous host without substantially affecting the structure of the organized regions thereof, and some of the said materials are considered to be attractive for use as anode materials in lithium-ion batteries. When the alloying atoms are silicon, for example, the reversible capacity of the resulting anode material can be increased over that of the carbonaceous host alone, while still maintaining cycling performance similar to the carbonaceous host. Nanodispersed silicon can reversibly bond up to about 1.5 lithium atoms. The carbonaceous matrix, characterized by a large degree of turbostatic disorder, provides diffusion pathways to the nanodispersed silicon atoms while retaining its capacity to intercalate lithium.

Many of the above modified carbon materials, however, require complex production processes and delicate operating conditions, and involve the use of technically advanced equipment and costly starting materials. In view of that, it is an object of the present invention to provide a new type of carbon-based anode material having substantially a graphite structure, which may be produced from inexpensive starting materials and offers some advantages over the conventional graphite anodes, such as a better performance and a more flexible choice in the overall design of the lithium-ion cell.

In accordance with the present invention, the possibility of using different graphite intercalation compounds as precursors for the preparation of carbon anodes has been explored, and a specific potassium intercalated graphite, the well known and characterized first stage potassium intercalation compound of the formula $KC_8$, has been evidenced as a product with optimal features for use in the production of carbon-based negative electrodes for lithium-ion cells. The production and features of $KC_8$ are disclosed, in particular, by A. Herold in Physics and Chemistry of Materials with Layered Structures, Vol. 6, F. Levy Editor, p. 323., Reidel, Dodrecht (1979), and by T. Inoshita, K Nakao and H. Kamimura, in J. Phys. Soc. Jpn., 43, n. 4, p. 1273 (1977)."

As it will be clear in the following, specifically with reference to the electrochemical characterization of the material which is presented in the examples, it has been found that $KC_8$, used as the starting material of a negative electrode in a lithium-ion battery, irreversibly releases, at the first discharge cycle, the largest part of the originally intercalated potassium ions, and that the resulting graphite structure reversibly intercalates lithium up to the amount corresponding to $LiC_6$ in the subsequent cathodic cycle, at a fast rate. The improved kinetics of the electrochemical process is apparently due to the fact that the initial, chemically intercalated potassium "expands" the graphite structure, thereby causing an increase of the interlayer distance. This favorable interlayer distance, which enhances the subsequent Li intercalation-deintercalation process, remains after the electrochemical removal of potassium. Furthermore, when the starting anode material is $KC_8$, an already lithiated material is not required for the cathode, and the lithium-ion cells according to the invention can employ as the cathode any lithium intercalating compound, i.e. both partially lithiated and lithium-free. While the lithium-ion cells based on conventional carbon anodes must be fabricated in the discharged state, i.e. they contain a combination of carbon or graphite with a lithiated metal oxide, and must be charged before use, the cells according to the invention undergo a first "activation" discharge cycle by which potassium is released into the electrolyte and the lithium ions which are intercalated from the electrolyte into the (lithium-free) cathode material are compensated by the potassium ions released therein.

Thus, the main advantages of the anode material according to the invention over the more conventional graphite are the faster kinetics of tl-i electrochemical process and the possibility of a wider choice of the positive counterelectrode material. In addition, due to the metallic character of the $KC_8$ compound, the anodes may be produced also in the absence of a binder, as their mechanical stability and adherence to the current collector is satisfactory also when no binder is present in the anodic material.

Therefore, the present invention specifically provides a lithium-ion rechargeable battery with carbon-based anode comprising a cathode based on a lithium intercalating compound (i.e. an inorganic compound capable of undergoing lithium intercalation), a non-aqueous lithium ion-conducting electrolyte and a carbon-based anode, characterized in that said carbon-based anode comprises, as the starting active material before the first cycle of the battery, the potassium intercalated graphite of the formula $KC_8$ (first stage potassium graphite intercalation compound). According to an alternative definition, said carbon-based anode comprises, as the active material, a graphite intercalation compound resulting from the cycling of the said potassium intercalated graphite of the formula $KC_8$.

As pointed out before, the carbon-based anode according to the invention may be binder-free: In this case, it may be simply obtained by pressing the potassium intercalated graphite of the formula $KC_8$, previously prepared, on a metal current collector, or it may be produced by chemical intercalation of potassium in a graphite film directly provided as a coating onto a metal current collector. The production of $KC_8$, be it with or without the thin metal substrate serving as the current collector, can be carried out by chemical vapor deposition according to the references cited above. According to said procedure, which will be described in detail in the following examples, powdered graphite of the appropriate dimensions (preferably not exceeding 100 μm), optionally pre-treated before use at high temperature and under vacuum, is placed in a glass tube, at one end thereof, normally by spreading it in the form of a suspension in a suitable solvent. When the reaction is carried out directly on the metal foil substrate to be used as the current collector, graphite is coated on said substrate. Potassium is then placed at the other end of the tube and the latter is sealed and heated in a temperature gradient oven at 250–300° C., where the graphite film is kept at a temperature 10–15° C. higher than potassium. The gas phase reaction is allowed to proceed for a time normally comprised between 5 and 8 hours.

According to a different embodiment of the present invention, said carbon-based anode may comprise a binder, or a mixture of binders, in a total amount comprised between 3 and 10% by weight, preferably about 5% by weight. Preferred binders are chosen from the group consisting of polyvinylidene fluoride, polyethylene, polytetrafluoroethylene and polyvinylchloride, while a particularly preferred binder is polyvinylidene fluoride (PVDF). When a binder is used in the anode material, the production process described before is carried out in a similar fashion, with the only difference that the reaction temperatures are preferably lower (e.g., 250° C.) in order to avoid the decomposition of the binder, and that the reaction times are consequently longer (e.g., 24 hours).

As pointed out before, the lithium intercalating compound of the storage battery according to the invention, before the first cycle thereof, may be a lithium-free compound. In this case said compound may advantageously be one of the following: $V_2O_5$, $TiS_2$, $MnO_2$, $Cr_2O_5$, $MoS_2$, $Mo_6S_8$, $V_6O_{13}$, $NbSe_3$, the first one being particularly preferred. In the alternative, said lithium intercalating compound, again considered before the first cycle of the battery, may be a lithiated metal oxide or chalcogenide, preferably a lithiated transition metal oxide, wherein part of the lithium is optionally substituted with sodium. Suitable examples of such compounds are: $Li_{1/3}Na_{(1+x)}V_3O_8$ (with $x \cong 0.02$), $LiCoO_2$, $LiNiO_2$, $LiMnO_2$, $LiMn_2O_4$, $LiFeO_2$, where the first one is particularly preferred.

As in the known lithium-ion batteries, said non-aqueous lithium ion-conducting electrolyte may either be liquid or solid. In the first case the electrolyte consists of a solution of a lithium salt, such as $LiClO_4$, $LiPF_6$, $LiBF_4$, $LiAsF_6$ and $LiCF_3SO_3$, in an organic solvent or in a mixture of organic solvents, such as ethylene carbonate, dimethylcarbonate, propylene carbonate, diethylcarbonate, dimethoxyethane, diethoxyethane, methylformate, methylacetate and mixtures thereof. A preferred choice consists in a solution of 1 M $LiClO_4$ in an ethylene carbonatedimethylcarbonate mixture (EC-DMC) (1:1 molar ratio). When the electrolyte is solid, it may be a complex of a polymer with a lithium salt, such as $LiClO_4$-polyethylene oxide, or it may consist of a polymer matrix, such as a polyacrylonitrile, polyvinylchloride or polymethacrylate, soaked with a liquid polymer.

The preparation and electrochemical characterization of some anode materials according to the present invention, as well as the preparation and performance of some lithium-ion secondary batteries employing said anodes, and some theoretical considerations about their working mechanism, are given in the following examples, which, however, are not intended to be a limitation of the applicability of this invention. In the examples which follow, reference will be made to the accompanying drawings, wherein:

EXAMPLE 1

Preparation and Electrochemical Characterization of KC8 Film Electrodes

The preparation of $KC_8$ electrodes involved first the spreading of a suspension of graphite (average size 10–100 $\mu$m) in dimethylsulfoxide with or without a binder [poly (vinylidene fluoride), PVDF, 5% by weight] on a copper foil substrate. After drying at 250° C. under vacuum for 24 h, the coated substrate was placed at one extreme of a glass ampoule having at the other extreme potassium metal in small stoichiometric excess. The ampoule was then sealed and housed in a 250–280° C. temperature gradient oven in such a way as to keep the graphite film at a temperature 10–15 degrees higher than that of potassium. After allowing a reaction time between 5 and 8 h (depending on the amount of reactants), the ampoule was removed from the oven and slowly cooled to room temperature.

In this way, adherent $KC_8$ films of average thickness around 25–20 $\mu$m were obtained. Due to the metallic character of $KC_8$, these films can be satisfactorily obtained also in the absence of a binder. A critical factor for a successful fabrication of uniform and mechanically stable $KC_8$ films appears to be the value of the particle size of the starting graphite, which should not exceed 100 $\mu$m.

The investigation of the electrochemical properties of the $KC_8$ film electrodes was carried out in a threeelectrode cell where a Li metal strip served both as the counter and as the reference electrode. A 1 M $LiClO_4$ solution in an ethylene carbonate-dimethylcarbonate mixture (EC-DMC, 1:1 molar ratio) served as the liquid electrolyte. The $KC_8$ films were also characterized by X-ray analysis prior to and after intercalation. For this purpose, samples were deposited on glass substrates with the addition of a nickel grid, the latter used as an internal standard. For comparison reasons pure graphite electrode films were also prepared and tested.

A voltammetric scan of the $KC_8$ electrode in the $LiClO_4$ EC-DMC electrolyte solution mentioned above resulted in a first anodic scan showing a well-defined peak at about 700 mV vs Li. In the reverse scan only a reversible wave, consisting of closely spaced peaks, was observed around 130 mV vs Li, while the previously observed 700 mV anodic peak was completely absent. The latter trend was then reproduced in all subsequent cycles. Said voltammetric response is interpreted by associating the 700 mV anodic peak appearing at the first cycle to the irreversible release of the largest part of potassium ions from the $KC_8$ insertion compound. Once released into the electrolyte, the $K^+$ ions compete with the $Li^+$ ions to be intercalated back into the graphite structure during the reverse anodic scan. However, due to their smaller size and much higher concentration the $Li^+$ ions are favored. Thus the anodic scan, as well as all subsequent cycles, are associated with the reversible lithium intercalation-deintercalation in and out of the graphite structure, which still contains a small residual amount of potassium.

The above mechanism is confirmed by the X-ray analysis, whose results appear in the following table. In fact, the diffraction patterns of the cycled electrode (polarized at 10 mV vs Li) reveal that the original peaks related to $KC_8$ are replaced by the new peaks characteristic of the lithiated graphite compounds, such as $LiC_6$ or $LiC_x$, where $12 < x < 18$.

TABLE 1

X-ray diffraction powder analysis of pure graphite and of the KC$_8$ materials

| Graphite | | | | KC$_8$ pristine | | | | KC$_8$ cycled (polarized at 1400 mV vs Li) | | | | KC$_8$ cycled (polarized at 10 mV vs Li) | | | |
|---|---|---|---|---|---|---|---|---|---|---|---|---|---|---|---|
| 2θ | d | hkl | I | 2θ | d | hkl | I | 2θ | d | hkl | I | 2θ | d | hkl | I |
| 26.52 | 3.36 | 002 | 100 | 16.55 | 5.36 | 001 | 45.6 | 24.18 | 3.66 | 001 LiC$_6$ | 11 | 23.90 | 3.72 | 001 LiC$_6$ | 100 |
| | | | | 33.45 | 2.68 | 002 | 100 | 25.25 | 3.51 | 002 LiC$_{12/16}$ | 30 | 25.15 | 3.54 | 002 LiC$_{12/16}$ | 12.3 |
| | | | | 51.20 | 1.78 | 003 | 4.4 | 26.16 | 3.41 | 002 graphite | 100 | 26.10 | 3.41 | 002 graphite | 4.3 |
| | | | | | | | | | | | | 49.25 | 1.85 | 002 LiC$_6$ | 13.0 |

The diffraction analysis also shows that the initial, chemically intercalated potassium "expands" the graphite structure, and that this favorable interlayer expansion remains after the electrochemical removal of potassium. The interlayer distance in cycled KC. electrode (d=3.41 Å) is higher than that of pure graphite (d=3.36 Å). Said structural modification favors the subsequent intercalation-deintercalation process with a consistent enhancement of its kinetics. Actually, a comparison of the low-scan rate cyclic voltammograms of conventional graphite and of KC$_8$ obtained according to this Example show that the anodic and cathodic peaks of the former are sharper and closer in voltage than those of the latter.

The repeated anodic-cathodic galvanostatic cycles of the KC$_8$ electrode in the LiClO$_4$ EC-DMC electrolyte also confirmed the above findings. The first cycle clearly reveals the 700 mV anodic plateau related to the potassium release, the capacity involved in this plateau being 265 mAh/g, i.e. equal to 94.6% of the value expected for full potassium removal (280 mAh/g). After this initial step, the subsequent cycles follow the trend typically expected for the Li intercalation-deintercalation process in graphite.

EXAMPLE 2

Preparation and Performance of a Lithium-Ion Battery with the KC$_8$ Anodes of Example 1

The performance of KC$_8$ film electrodes as anode materials in rocking-chair cell secondary batteries was evaluated using vanadium pentoxide, V$_2$O$_5$, as the positive electrode, in the electrolyte solution described in Example 1 (1 M LiClO$_4$ in EC-DMC). The behaviour of the cell, and specifically the measure of the voltage thereof vs the time at current rate of 0.1 mA/cm$^2$ for the first and second charge-discharge cycles, confirms the results shown in the previous Example as concerns the first "activation" discharge cycle, during which potassium is irreversibly released into the electrolyte. The first cycle process may be represented as follows:

anode: KC$_8$→K$^+$ (electrolyte)+8C (electrode)+e$^-$ cathode: V$_2$O$_5$+Li$^+$ (electrolyte)+e$^-$→LiV$_2$O$_5$ Following this activation process, the cell apparently assumes the configuration of a "conventional" lithium ion battery and, as the latter, it operates with the reversible exchange of lithium ions between the two electrodes. For the second and any subsequent cycle the reaction is as follows:

LiV$_2$O$_5$+8C⇔LiC$_x$+V$_2$O$_5$ where LiC$_x$ formally indicates that the product of the second charge process is a mixture of different stage lithium-carbon intercalated compounds. This main process is highly reversible and, consequently, the cell may be cycled many times.

EXAMPLE 3

Preparation and Electrochemical Characterization of KC$_8$ Electrodes with Binder In order to prepare further KC$_8$ electrodes with binder, Alfa or Lonza natural graphites with average dimensions in the range 10–100 μm were pretreated before use, under vacuum, at high temperature (400 to 500° C.) for at least 24 hours. The chemical intercalation was carried out directly on thin films on the current collectors. Following the established procedure referred to above, KC$_8$ was prepared by the gas phase route by chemical vapor deposition. To this purpose the preparation of KC$_8$ electrodes involved first the spreading of a suspension of graphite in dimethylsulfoxide, with 5% by weight binder (polyvinylidene fluoride, PVDF), on a copper current collector. After drying at 250° C. for 24 hours, the substrate was placed in a glass container, potassium was placed at the opposite end in the container and the latter was sealed under vacuum. The materials were allowed to react 24 hours in a temperature gradient oven adjusted to maintain the graphite at a temperature 10–15 degrees higher than potassium. In order to avoid the decomposition of the binder the reaction temperatures were realtively low (around 250° C.).

For comparison purposes, LiC$_6$ was also prepared, by proceeding in a similar way. A mixture of lithium, in slight excess with respect to the stoichiometry, and graphite were reacted in a stainless steel container loosely closed with a cap of the same material and sealed under vacuum in a glass container. Steel minimizes direct reaction of lithium with glass. The reaction vessel was kept in a oven at 390° C. for 10/12 days.

All preparation and handling was performed inside an argon filled dry box with an oxygen and water level below 2 ppm. All the electrochemical tests, either cyclic voltammetric studies or galvanostatic charge and discharge cycles, were performed inside the dry-box using a three electrode spring loaded button cell. Lithium was used as reference and as counter electrode during preliminary tests. Celgard 2400 from Hoechst Celanese soaked with a 1 M LiClO$_4$ solution of ethylene carbonate-dimethylcarbonate (EC-DMC, 1:1 weight ratio) was used as separator. New electrodes were usually left to equilibrate at open circuit overnight before use. The compounds were also characterized by X-ray analysis prior (graphite) and after intercalation. For this purpose the samples were deposited on glass substrates with the addition of a nickel grid, the latter used as internal standard. The distribution of potassium in the cell components was studied using atomic emission spectroscopy.

Figure 1:
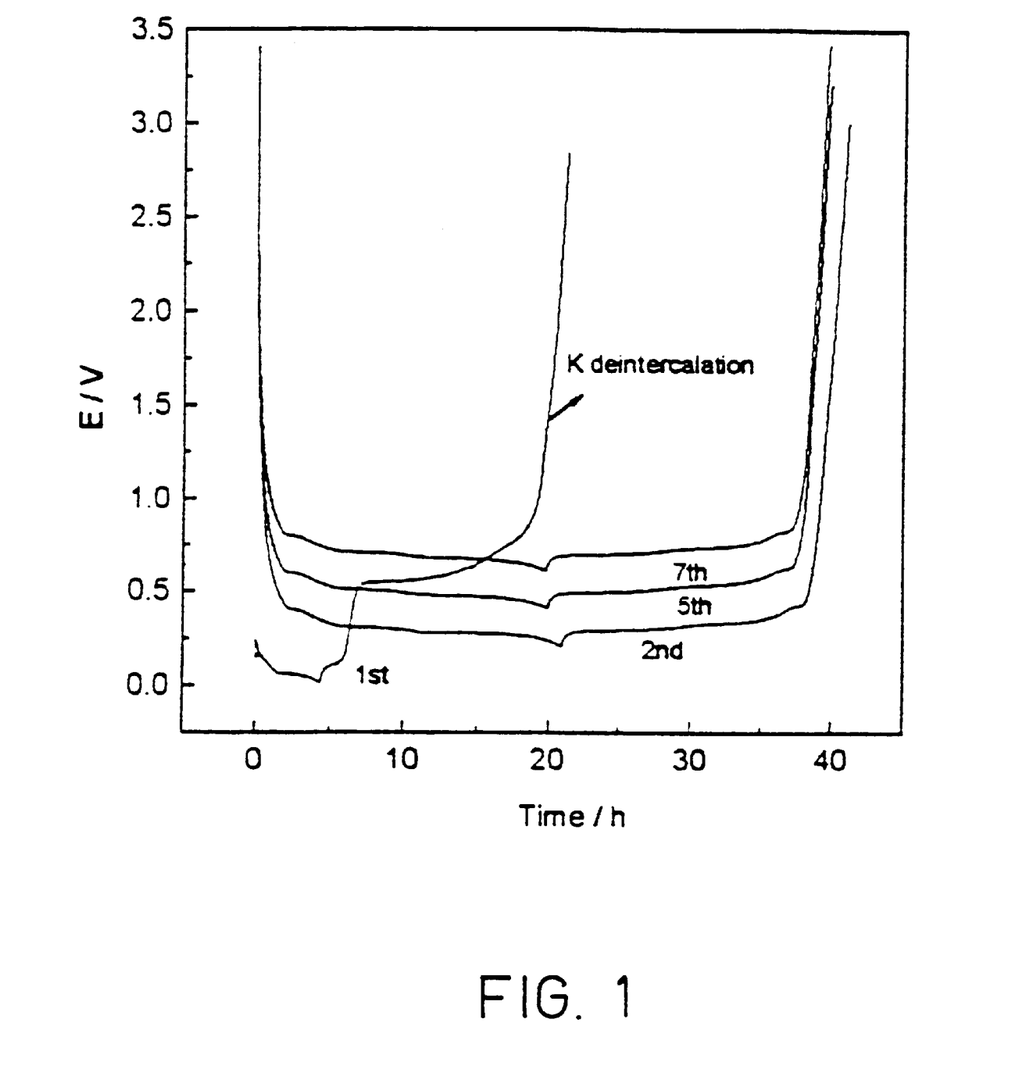
FIG. 1 shows the repeated anodic-cathodic galvanostatic cycles of the $KC_8$ electrode according to Example 3.

FIG. 1 shows a series of constant current charge-discharge curves for the $KC_8$ electrode prepared as above. For the sake of clarity each curve was displaced by 200 mV towards positive potentials. The sequence was initiated from the equilibrium potential in the discharging direction (lithium loading) and inverted at 2 mV vs Li. The subsequent charging curve consists of two plateaus at about 100 and 600 mV vs Li. The first small plateau is related to the deintercalation of a small quantity of lithium inserted during the previous scan, while the plateau at about 600 mV is related to the irreversible deintercalation of the potassium present as $KC_8$ in the original electrode. The fact that some lithium may be intercalated in a freshly prepared $KC_8$ electrode is probably related to the presence of some unreacted graphite and/or to some decomposition of $KC_8$ upon immersion in the electrolyte. The picture does not change if the electrode is first charged and then discharged. The second and subsequent cycles show the classical shape of a graphite electrode undergoing galvanostatic lithium intercalation-deintercalation cycles.

Figure 2:
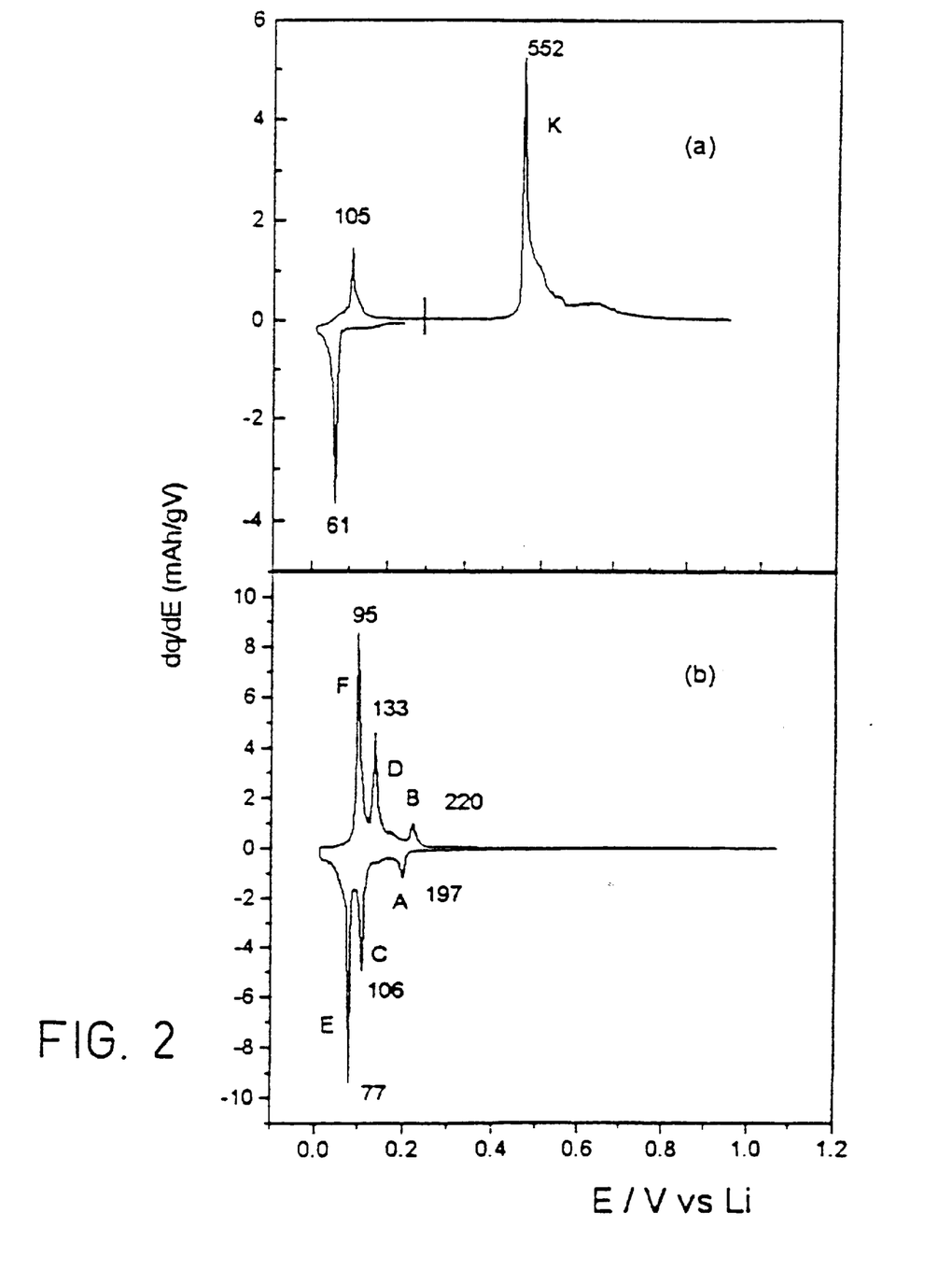
FIG. 2 shows the differential capacity curves vs E, i.e. the dq/dE plots for the first and second cycle (respectively, panels a and b) of the same $KC_8$ electrode.

The foregoing results more evident from FIG. 2, where the first and second cycle have been converted to differential capacity curves vs E. The curves have been limited to the potential range 0–1.2 V as all the relevant processes occur within these limits. The first cycle (panel a) clearly shows peaks corresponding to partial intercalation-deintercalation of lithium and the irreversible peak due to the deintercalation of potassium. In the second cycle, no peak related to potassium is seen, while the series of peaks below 230 mV is characteristic of the formation of different stage Li intercalation compounds in graphite.

Figure 3:
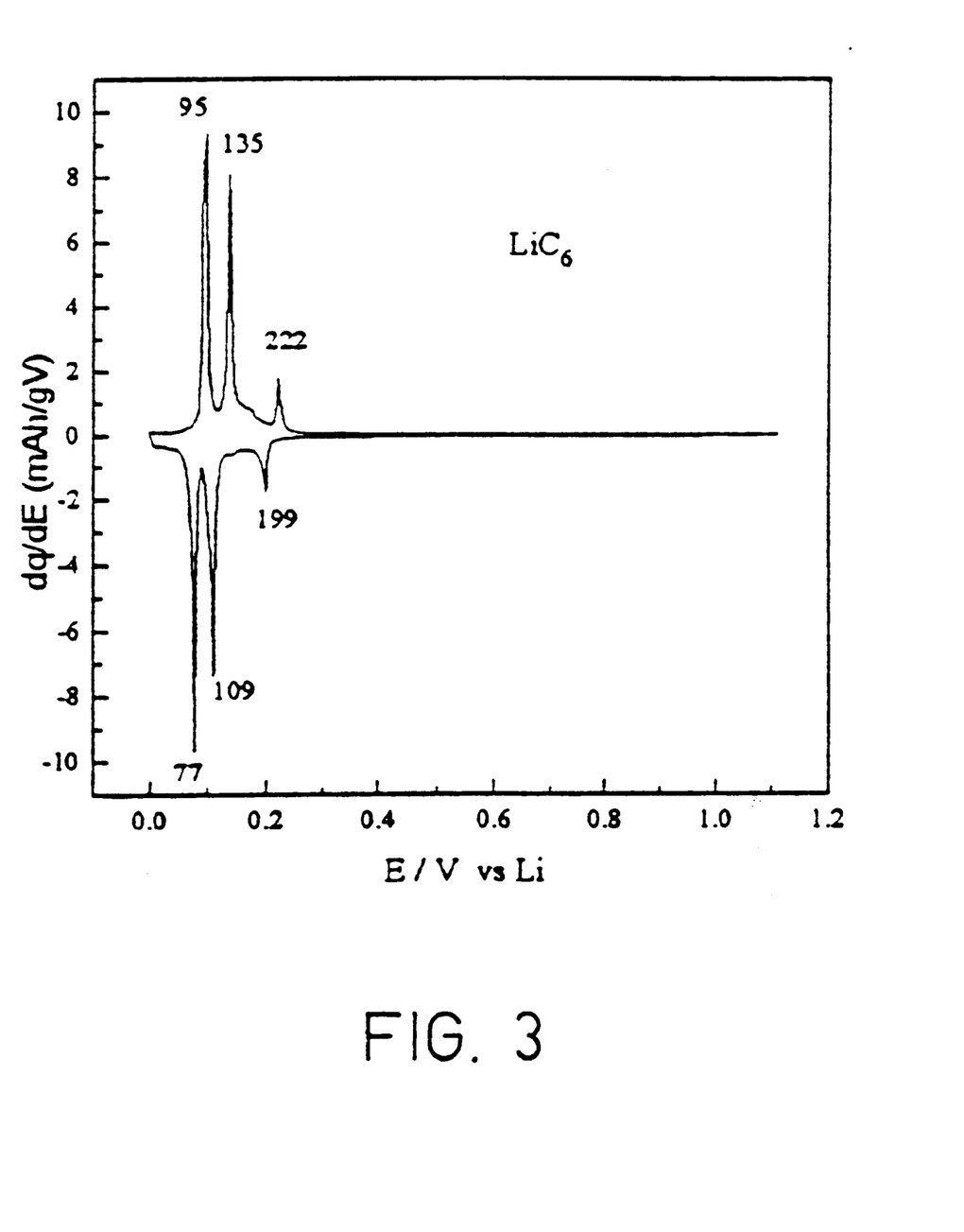
FIG. 3 shows the dq/dE plot for a chemically prepared $LC_6$ electrode, also obtained according to Example 3 and operated in the same conditions as the electrode of the test shown in FIG. 2.
Figure 4:
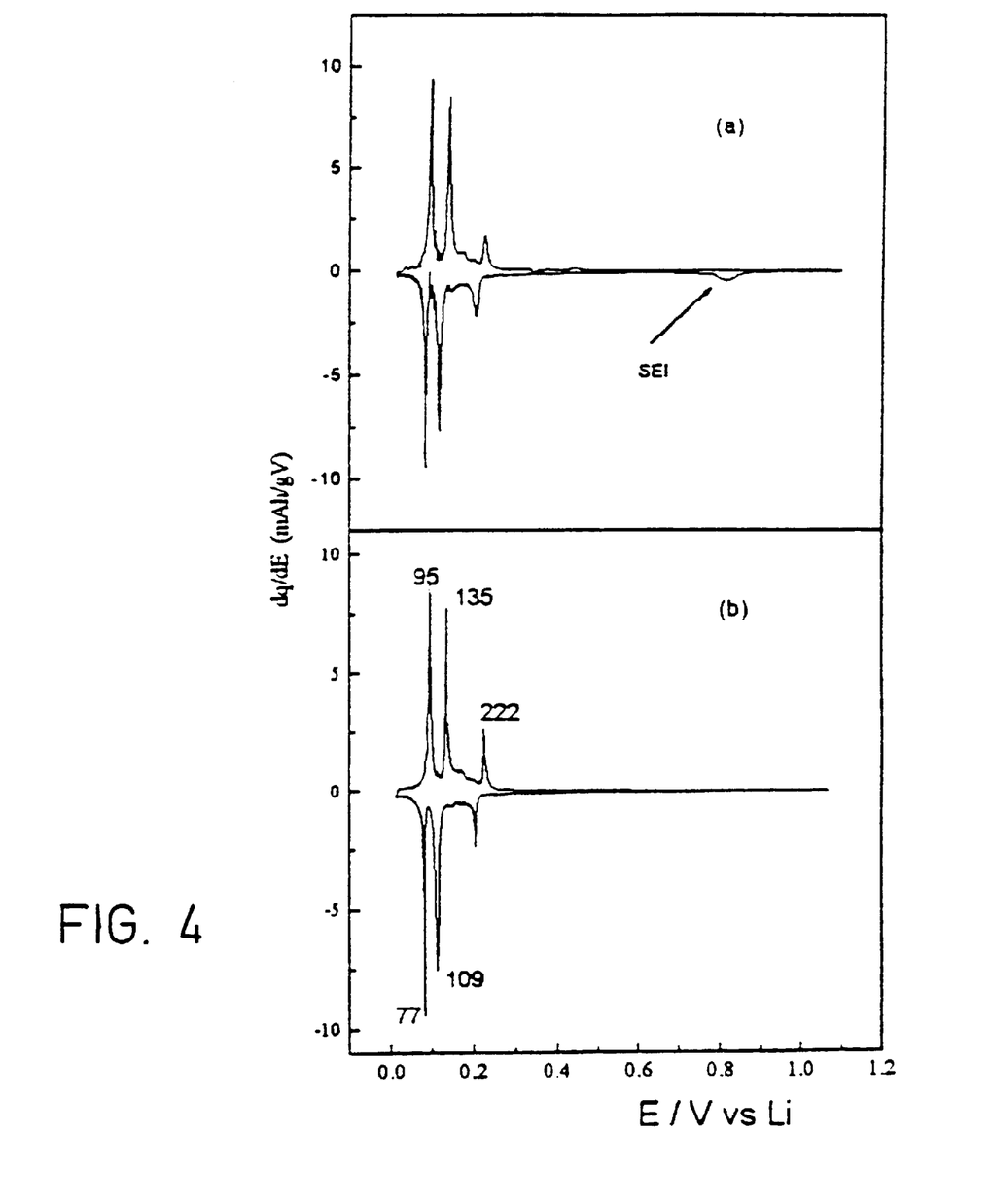
FIG. 4 shows the dq/dE plot for the first and third cycle (respectively, panels a and b) of a pure graphite electrode, operated in the same conditions as the electrode of the test shown in FIG. 2.

This interpretation is supported by literature (T. Ohzuku, Y. Iwakoshi, K. Sawai J. Electrochem. Soc., 140, 2490 (1993)), by the X-ray data and by the comparison with the curves obtained in the same experimental conditions with electrodes prepared with $LiC_6$ (FIG. 3) and with pure graphite (FIG. 4). As it may be seen, the differential capacity curve obtained with a $LiC_6$ electrode (without binder) shows the same pattern of peaks relative to lithium staging in graphite displayed by the curve relative to the second cycle the $KC_8$ electrode, and of the second cycle of a pure graphite electrode (FIG. 4, panel b). The peak potentials are, within few mV, the same in all cases. In addition, the midpoint voltages between the anodic and cathodic peaks for the three main processes (86, 120 and 208 mV for $KC_8$, 87, 125 and 212 mV for pure graphite and 90, 122 and 210 mV for $LiC_6$, respectively) are practically equal to those quoted by Ohzuku et al. in a combined electrochemical and X-ray study of graphite in the same solvent (85,120 and 210 mV).

In FIG. 4, panel a, it is also evident a cathodic irreversible wave at about 800 mV. This is related to the irreversible capacity loss, characteristic of graphite, connected with formation of the so called solid electrolyte interface (SEI). Notably this peak is absent for the $KC_8$ electrodes according to the invention.

Based on the literature and on the experimental results, the wave shown by the letter K in panel a of FIG. 2 is attributed to the irreversible release of the largest part of K+ions from the electrode, with an associated irreversible capacity referred to graphite of 279 mAh/g. The couples A-B, C-D and E-F in FIG. 2 (panel b) and the corresponding couples in FIG. 3 and in FIG. 4 (panel b) are interpreted, in view of the current knowledge on the lithium intercalation-deintercalation processes, as corresponding, respectively, to formation of $LiC_{12}$ from $LiC_6$ with a reversible potential of 85 mV and an associated capacity equal to 186 mAh/g, to the formation of $LiC_{18}$ with a reversible potential of 120 mV (although the X-ray data indicate the coexistence of $LiC_{12}$ and $LiC_{18}$, both second stage) and to the formation of the coexistent fourth and eighth stage compounds ($LiC_{36}$ and $LiC_{72}$), with a reversible potential of 210 mV.

As pointed out before, as a consequence of the "expansion" of the graphite interlayer resulting from the intercalation of potassium, as shown by the X-ray analysis, the subsequent lithium intercalation process appears kinetically easier. The most plausible hypothesis that may account for the expansion of the graphite lattice is that the deintercalation of potassium proceeds through formation of higher order potassium intercalates (such as $KC_{24}$ and $KC_{36}$) where the density and concentration of potassium is much lower than in the starting compound.

From the point of view of the utilization of the $KC_8$ compound in place of pure graphite in a lithium-ion battery, it is important to notice that the "expansion", and hence its effect on the subsequent lithium intercalation, persists also in the case of complete decomposition of the initial compound. This has been verified by running cells using electrodes obtained from powdered $KC_8$ left for days in the electrolyte. In these cases discoloration of the original compound, indicating partial decomposition, was macroscopically evident and consistent with a much lower than theoretical charge associated with K deintercalation. However, no differences were found in the electrochemical performances of the cells. As to the fate of the potassium ion released into the electrolyte, analysis of the different components of disassembled cells has shown that most of 80% are in the electrolyte, the rest being in the solution used to wash the electrodes. This leads to the conclusion that the deintercalated potassium simply substitutes the lithium ions in solution thus maintaining the electroneutrality. Because of the different size and lower concentration the $K^+$ ions do not appear to compete with lithium intercalation in the subsequent cycles.

Figure 5:
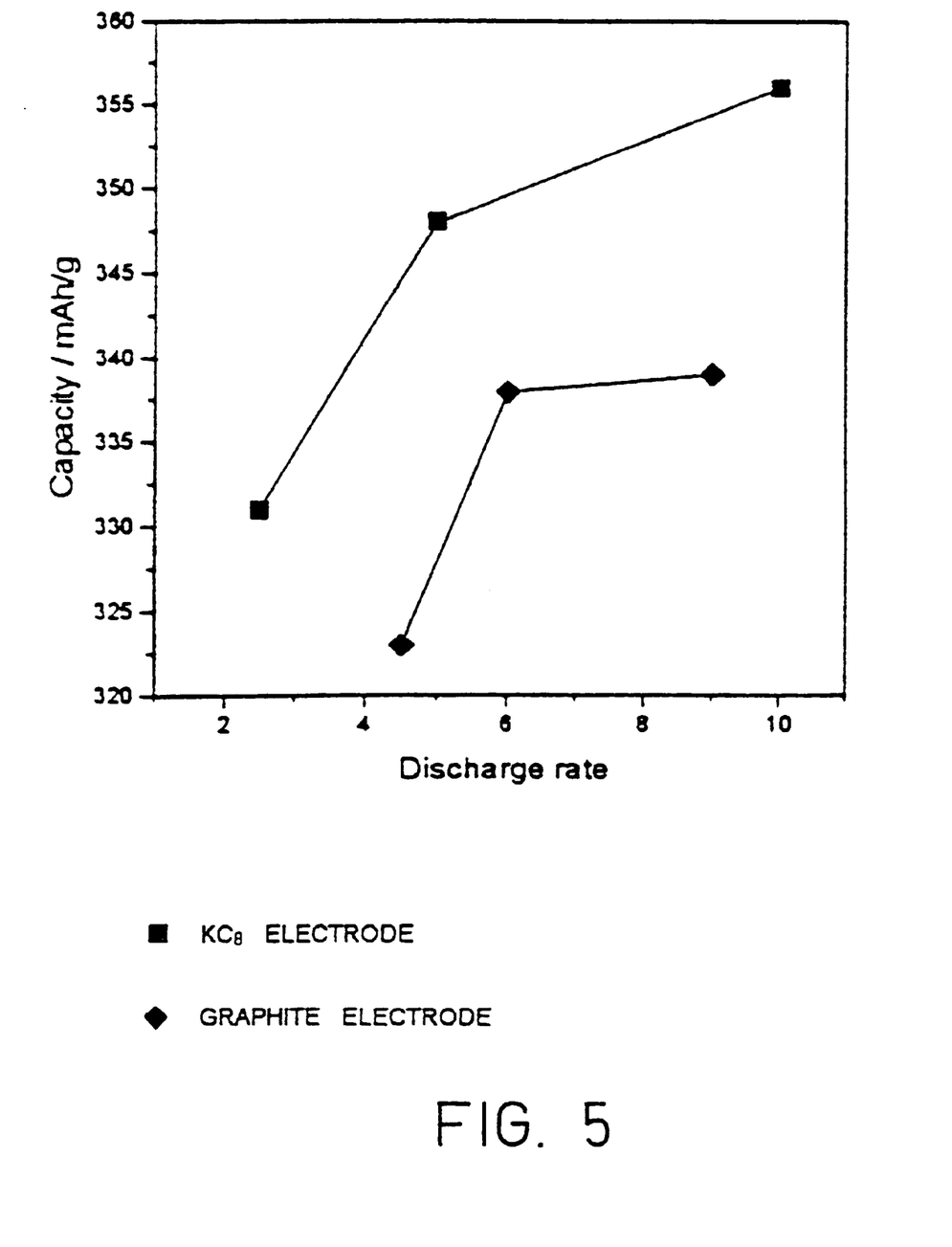
FIG. 5 shows a plot of the discharge capacity vs the discharge rate for the $KC_8$ electrode according to Example 3 and the graphite electrodes, in the same operating conditions.

Consistently with the cyclic voltammetric data, the easier kinetics of the graphite electrodes prepared from $KC_8$, as compared to those obtained from pure graphite, results also from the comparison of cyclability data obtained from electrodes prepared as above and graphite electrodes prepared using the same type of graphite and the same type and content of binder. The cells, that used a lithium counter and reference electrode, were cycled at different rates for more than 100 cycles. FIG. 5 shows the discharge capacity, expressed in mAh/g, vs discharge rate for graphite and $KC_8$ electrodes. As it may be seen, the rated discharge capacity for the $KC_8$ electrode is always larger than that of graphite, reaching a value of about 88% when discharged at 400 $\mu A/cm^2$, corresponding to C/2.5, i.e. higher than that of graphite at C/4.5.

EXAMPLE 4

Preparation and Electrochemical Characterization of $KC_8$ Electrodes without Binder As far as binder-less electrodes are concerned, both $KC_8$ and $LiC_6$ (for comparison purposes) electrodes can be prepared by simply pressing the compound on the appropriate current collector, or by direct preparation by chemical reaction of the metals as described in Examples 1 and 3. According to the first alternative, electrodes without binder were prepared by pressing the pure compounds on copper or stainless steel 12 mm diameter current collectors. Because of the metallic character of the compounds, the pellets (25 to 50 mm thick) were mechanically stable and adherent to the electrode also in the absence of any binder.

The cyclability tests show that, contrary to what happens with pure graphite, that deteriorates rapidly in few cycles, binder-less $KC_8$ electrodes perform in the same way as electrodes with binder. The overall electrochemistry, as shown by the curve shape, is the same.

EXAMPLE 5

Preparation and Performance of Lithium-Ion Batteries with the $KC_8$ Anodes of Example 3

Two types of cathode materials may be used with $KC_8$ electrodes depending on the final capacity required for the anode. The limiting capacity that may be obtained when using a lithium free cathodic material, $V_2O_5$ for instance, is 279 mAh/g: i.e. the capacity associated with potassium deinter calation. The possibility to use all the available graphite capacity requires a cathode material initially containing enough lithium to compensate for the different stoichiometry of $KC_8$ and $LiC_6$, i.e. the initial lithium content (referred to one mole of $KC_8$) should be equal to ⅓.

This is easily understood by considering the pertinent equation for a generic cell using a $KC_8$ electrode and a generic cathode $Li_xMX_y$, where M=one or more atoms of metallic element(s), X=oxygen or chalcogen (i.e., S or Se), and x=0, as lower limit. The activation process is given by:

anode: $KC_8 \rightarrow K^+ + e^- + 8C$ cathode: $Li_xMX_y + Li^+ + e^- \rightarrow Li_{1+x}MX_y$ The charge balance in the electrolyte is maintained because the moles of $Li^+$ intercalated are compensated by the moles of $K^+$ deintercalated from $KC_8$. The following discharge and all the other cycles depend on the values of x, the lower limiting case being (x=0):

$8C + Li^+ + e^- \Leftrightarrow LiC_6 + 2C$ $LiMX_y \Leftrightarrow Li^+ + e^- + MX_y$ In the above reactions it has been assumed that the final product is a mixture of $LiC_6$ and unreacted graphite. More realistically, $LiC_6 + 2C$ may be thought as being a mixture of different stage lithium intercalated compounds. The total cell reaction may be written as:

$8C + LiMX_y \Leftrightarrow LiC_6 + MX_y + 2C$ anodically limited to a maximum capacity 279 mAh/g.

In the upper limiting case x=⅓, so that during the activation the cathode reaction is given by:

$Li_{1/3}MX_y + e^- + Li^+ \rightarrow Li_{4/3}MX_y$ while in the following cycles the electrode reaction become:

$8C + ⅓ Li^+ + ⅓ e^- \Leftrightarrow ⅓ LiC_6$ $Li_{4/3}MX_y \Leftrightarrow ⅓ Li^+ + ⅓ e^- + MX_y$ with a total cell reaction corresponding to $8C + Li_{4/3}MX_y \Leftrightarrow ⅓ LiC_6 + MX_y$ and an associated capacity equal to 372 mAh/g.

The above hypothesis has been verified by means of two different types of lithium-ion cells, based, respectively, on lithiated and lithium-free cathode materials. $Na_{(1+x)}V_3O_8$ and $V_2O_5$ (Alpha Inorganics) electrodes were prepared as pellets by pressing at 6 ton/cm² a mixture of the compounds and acetylene black (30% by weight) on a stainless steel current collector. A nickel grid was spotwelded to the current collector surface to improve the mechanical resistance of the pellet. The starting amorphous $Na_{(1+x)}V_3O_8$ (x=0.02) was prepared as described in T. Tossici, R. Marassi, M. Berrettoni, S. Stizza and G. Pistoia, Solid State Ionics, 67, 77, (1993), and partially lithiated chemically in a solution of n-butyllithium in n-hexane.

The anode was a $KC_8$ electrode in both cases. The above cathodes were loaded with a quantity of active material 5% greater than the amount required to match formation of $LiC_6$ at the anode. In the case of the $V_2O_5$ cell the cathode cutoff voltage was set at 3.8 V, 100 mV greater than the open circuit potential of the electrode when the cell was assembled, to avoid solvent and/or active compound decomposition. The anodic cutoff was 2.8 V. These values prevent inversion of the cell voltage during operation. In the case of the $Li_{1/3}Na_{(1+x)}V_3O_8$ cell the cell operation was controlled using the anode potential with cut-off values set at 5 and 2400 mV. In this case presence of an excess of lithium in the cathode makes the cell anodically limited.

The differential capacity plots obtained by operating the two above cells both show a first "activation" half cycle, which revealed the deintercalation of potassium. In the following half cycle, lithium loading occurs. While in the case of the $Li_{1/3}Na_{(1+x)}V_3O_8$ cathode lithium intercalation procedes up to $LiC_6$, in the case of the $V_2O_5$ cathode said intercalation stops at about 100 mV vs Li at the level of peak C in FIG. 2. The behaviour is the one expected from the first activation cycle. The average capacities over the first ten cycles are 237 mAh/g and 317 mAh/g for the $V_2O_5$ and $Li_{1/3}Na_{(1+x)}V_3O_8$ cells, values very close to 85% of the expected capacity (respectively, 279 mAh/g and 372 mAh/g).

We claim:

1. A lithium-ion rechargeable battery with carbon-based anode comprising a cathode based on a lithium intercalating compound, a non-aqueous lithium ion-conducting electrolyte and a carbon-based anode, characterized in that said carbon-based anode comprises, as the starting active material before the first cycle of the battery, the potassium intercalated graphite of the formula $KC_8$ (first stage potassium graphite intercalation compound).

2. A lithium-ion rechargeable battery with carbon-based anode comprising a cathode based on a lithium intercalating compound, a non-aqueous lithium ion-conducting electrolyte and a carbon-based anode, characterized in that said carbon-based anode comprises, as the active material, a graphite intercalation compound resulting from the cycling of the potassium intercalated graphite of the formula $KC_8$ (first stage potassium graphite intercalation compound).

3. A lithium-ion rechargeable battery according to claim 1 wherein said carbon-based anode is binder-free, and is obtained by pressing said potassium intercalated graphite of the formula $KC_8$, previously prepared, on a metal current collector.

4. A lithium-ion rechargeable battery according to claim 1 wherein said carbon-based anode is binder-free, and is obtained by chemical intercalation of potassium in a graphite film directly provided as a coating onto a metal current collector.

5. A lithium-ion rechargeable battery according to claim 1 wherein said carbon-based anode also comprises from 3 to 10% by weight of a binder, or of a mixture of binders.

6. A lithium-ion rechargeable battery according to claim 5, wherein said binder is chosen from the group consisting of polyvinylidene fluoride, polyethylene, polytetrafluoroethylene and polyvinylchloride.

7. A lithium-ion rechargeable battery according to claim 1 wherein said lithium intercalating compound, before the first cycle of the battery, is a lithium-free compound.

8. A lithium-ion rechargeable battery according to claim 7, wherein said lithium-free compound is chosen from the group consisting of: $V_2O_5$, $TiS_2$, $MnO_2$, $Cr_2O_5$, $MoS_2$, $Mo_6S_8$, $V_6O_{13}$, $NbSe_3$.

9. A lithium-ion rechargeable battery according to claim 1 wherein said lithium intercalating compound, before the first cycle of the battery, is a lithiated metal oxide or chalcogenide.

10. A lithium-ion rechargeable battery according to claim 9, wherein said lithiated metal oxide is a lithiated transition metal oxide, wherein part of the lithium is optionally substituted with sodium.

11. A lithium-ion rechargeable battery according to claim 10, wherein said lithiated transition metal oxide is chosen from the group consisting of: $Li_{1/3}Na_{(1+x)}V_3O_8$, $LiCoO_2$, $LiNiO_2$, $LiMnO_2$, $LiMn_2O_4$, $LiFeO_2$.

12. A lithium-ion rechargeable battery according to claim 1 wherein said non-aqueous lithium ion-conducting electrolyte is liquid.

13. A lithium-ion rechargeable battery according to claim 12, wherein said electrolyte consists of a solution of a lithium salt in an organic solvent or in a mixture of organic solvents.

14. A lithium-ion rechargeable battery according to claim 13, wherein said lithium salt is chosen from the group consisting of: $LiClO_4$, $LiPF_6$, $LiBF_4$, $LiAsF_6$ and $LiCF_3SO_3$.

15. A lithium-ion rechargeable battery according to claim 14, wherein said organic solvent is chosen from the group consisting of: ethylene carbonate, dimethylcarbonate, propylene carbonate, diethylcarbonate, dimethoxyethane, diethoxyethane, methylformate, methylacetate and mixtures thereof.

16. A lithium-ion rechargeable battery according to claim 1 wherein said non-aqueous lithium ion-conducting electrolyte is solid.

17. A lithium-ion rechargeable battery according to claim 16, wherein said electrolyte is a complex of a polymer with a lithium salt, or is a polymer matrix soaked with a liquid polymer.

18. A lithium-ion rechargeable battery according to claim 2, wherein said carbon-based anode is binder-free, and is obtained by pressing said potassium intercalated graphite of the formula $KC_8$, previously prepared, on a metal current collector.

19. A lithium-ion rechargeable battery according to claim 2, wherein said carbon-basad anode is binder-free, and is obtained by chemical intercalation of potassium in a graphite film directly provided as a coating onto a metal current collector.

20. A lithium-ion rechargeable battery according to claim 2, wherein said carbon-based anode also comprises from 3 to 10% by weight of a binder, or of a mixture of binders.

* * * * *